(12) United States Patent
Burns et al.

(10) Patent No.: US 9,865,089 B2
(45) Date of Patent: Jan. 9, 2018

(54) VIRTUAL REALITY ENVIRONMENT WITH REAL WORLD OBJECTS

(71) Applicant: Microsoft Technology Licensing, LLC, Redmond, WA (US)

(72) Inventors: Aaron Burns, Newcastle, WA (US); Tom Salter, Seattle, WA (US); Ben Sugden, Redmond, WA (US); Jeff Sutherland, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/688,695

(22) Filed: Apr. 16, 2015

(65) Prior Publication Data
US 2016/0027215 A1    Jan. 28, 2016

Related U.S. Application Data

(60) Provisional application No. 62/029,351, filed on Jul. 25, 2014.

(51) Int. Cl.
*G06T 19/00*    (2011.01)
*G06F 3/01*    (2006.01)
(Continued)

(52) U.S. Cl.
CPC ........ *G06T 19/006* (2013.01); *G02B 27/0103* (2013.01); *G02B 27/017* (2013.01);
(Continued)

(58) Field of Classification Search
CPC .... G06T 19/006; G06F 3/011; G06F 3/04815; G06F 3/013; G02B 27/017; G02B 27/01;
(Continued)

(56) References Cited

U.S. PATENT DOCUMENTS

| 5,819,206 A | 10/1998 | Horton et al. |
| 5,877,748 A | 3/1999 | Redlich |

(Continued)

FOREIGN PATENT DOCUMENTS

| CN | 101540020 B | 9/2012 |
| CN | 103761085 A | 4/2014 |

(Continued)

OTHER PUBLICATIONS

Nilsen, et al., "Tankwar—Tabletop War Gaming in Augmented Reality", In 2nd International Workshop on Pervasive Gaming Applications, PerGames. vol. 5, Retrieved on: Sep. 12, 2014, 5 pages.

(Continued)

*Primary Examiner* — Haixia Du
(74) *Attorney, Agent, or Firm* — Mark K. Young; Mayer & Williams PC

(57) ABSTRACT

An HMD device renders a virtual reality environment in which areas of the real world are masked out so that real world objects such as computer monitors, doors, people, faces, and the like appear visible to the device user and no holographic or virtual reality content is rendered over the visible objects. The HMD device includes a sensor package to support application of surface reconstruction techniques to dynamically detect edges and surfaces of the real world objects and keep objects visible on the display as the user changes position or head pose or when the real world objects move or their positions are changed. The HMD device can expose controls to enable the user to select which real world objects are visible in the virtual reality environment.

20 Claims, 17 Drawing Sheets

(51) Int. Cl.
  *G02B 27/01* (2006.01)
  *G06T 19/20* (2011.01)
(52) U.S. Cl.
  CPC .......... *G02B 27/0172* (2013.01); *G06F 3/011* (2013.01); *G06F 3/012* (2013.01); *G06F 3/013* (2013.01); *G06T 19/20* (2013.01); *G02B 2027/014* (2013.01); *G02B 2027/0123* (2013.01); *G02B 2027/0174* (2013.01); *G02B 2027/0178* (2013.01)
(58) Field of Classification Search
  CPC ............... G09G 5/377; G09G 2340/12; G06K 9/00671; G06K 9/3241; G06K 9/00201
  See application file for complete search history.

(56) References Cited

U.S. PATENT DOCUMENTS

| | | | |
|---|---|---|---|
| 6,012,926 A | 1/2000 | Hodges et al. | |
| 6,023,275 A | 2/2000 | Horvitz | |
| 6,329,986 B1 | 12/2001 | Cheng | |
| 6,396,495 B1 | 5/2002 | Parghi et al. | |
| 6,396,497 B1 | 5/2002 | Reichlen | |
| 6,529,331 B2 | 3/2003 | Massof et al. | |
| 6,552,698 B1 | 4/2003 | Walker | |
| 6,741,241 B1 | 5/2004 | Jaubert et al. | |
| 6,898,266 B2 | 5/2005 | Griffith | |
| 7,274,380 B2 | 9/2007 | Navab et al. | |
| 7,386,799 B1 | 6/2008 | Clanton et al. | |
| 7,400,322 B1 | 7/2008 | Urbach | |
| 7,486,817 B2 | 2/2009 | Yanagawa et al. | |
| 7,538,775 B2 | 5/2009 | Ishihara | |
| 7,542,210 B2 | 6/2009 | Chirieleison, Sr. | |
| 7,557,774 B2 | 7/2009 | Baudisch et al. | |
| 8,049,750 B2 | 11/2011 | Gloudemans et al. | |
| 8,266,536 B2 | 9/2012 | Roberts et al. | |
| 8,405,680 B1 | 3/2013 | Cardoso Lopes | |
| 8,576,247 B2 | 11/2013 | Avkarogullari et al. | |
| 8,611,015 B2 | 12/2013 | Wheeler et al. | |
| 8,751,969 B2 | 6/2014 | Matsuda et al. | |
| 8,754,931 B2 | 6/2014 | Gassel et al. | |
| 8,780,014 B2 | 7/2014 | Border et al. | |
| 8,793,620 B2 | 7/2014 | Stafford | |
| 9,443,352 B1 | 9/2016 | Glover | |
| 2001/0035845 A1 | 11/2001 | Zwern | |
| 2002/0044152 A1 | 4/2002 | Abbott et al. | |
| 2002/0154214 A1 | 10/2002 | Scallie et al. | |
| 2002/0181115 A1 | 12/2002 | Massof et al. | |
| 2003/0091226 A1 | 5/2003 | Cahill | |
| 2005/0024388 A1 | 2/2005 | Takemoto | |
| 2005/0143887 A1 | 6/2005 | Kinoshita | |
| 2005/0179703 A1 | 8/2005 | Johnson | |
| 2006/0050070 A1 | 3/2006 | Matsui | |
| 2006/0092178 A1 | 5/2006 | Tanguay | |
| 2006/0095207 A1 | 5/2006 | Reid | |
| 2006/0241827 A1 | 10/2006 | Fukuchi | |
| 2007/0057946 A1 | 3/2007 | Albeck | |
| 2007/0132662 A1 | 6/2007 | Morita | |
| 2008/0174659 A1 | 7/2008 | McDowall | |
| 2008/0195315 A1 | 8/2008 | Hu | |
| 2008/0284864 A1* | 11/2008 | Kotake | G06K 9/3216 348/222.1 |
| 2009/0160985 A1 | 6/2009 | Javidi | |
| 2009/0167785 A1 | 7/2009 | Wong | |
| 2009/0325699 A1 | 12/2009 | Delgiannidis | |
| 2010/0208035 A1 | 8/2010 | Pinault | |
| 2010/0208057 A1 | 8/2010 | Meier | |
| 2010/0226017 A1 | 9/2010 | Spaller | |
| 2010/0315413 A1 | 12/2010 | Izadi et al. | |
| 2011/0029903 A1 | 2/2011 | Schooleman et al. | |
| 2011/0043627 A1 | 2/2011 | Werling et al. | |
| 2011/0140994 A1 | 6/2011 | Noma | |
| 2012/0052917 A1* | 3/2012 | Kim | G06F 3/04815 455/566 |
| 2012/0056876 A1 | 3/2012 | Lee et al. | |
| 2012/0068913 A1 | 3/2012 | Bar-Zeev et al. | |
| 2012/0092328 A1* | 4/2012 | Flaks | G02B 27/017 345/419 |
| 2012/0113092 A1 | 5/2012 | Bar-Zeev et al. | |
| 2012/0195471 A1 | 8/2012 | Newcombe | |
| 2012/0237116 A1 | 9/2012 | Xiao | |
| 2012/0249741 A1 | 10/2012 | Maciocci | |
| 2012/0309522 A1 | 12/2012 | Westlund et al. | |
| 2012/0313839 A1* | 12/2012 | Smithwick | G02B 27/2214 345/6 |
| 2012/0327116 A1 | 12/2012 | Liu et al. | |
| 2013/0044128 A1 | 2/2013 | Liu et al. | |
| 2013/0050258 A1 | 2/2013 | Liu et al. | |
| 2013/0050432 A1 | 2/2013 | Perez et al. | |
| 2013/0083007 A1 | 4/2013 | Geisner et al. | |
| 2013/0083018 A1 | 4/2013 | Geisner | |
| 2013/0088413 A1 | 4/2013 | Raffle et al. | |
| 2013/0093789 A1 | 4/2013 | Liu et al. | |
| 2013/0127860 A1* | 5/2013 | Hadap | G06T 7/507 345/426 |
| 2013/0127980 A1 | 5/2013 | Haddick | |
| 2013/0137076 A1 | 5/2013 | Perez et al. | |
| 2013/0141419 A1* | 6/2013 | Mount | G06F 3/011 345/419 |
| 2013/0147686 A1 | 6/2013 | Clavin et al. | |
| 2013/0194259 A1 | 8/2013 | Bennett et al. | |
| 2013/0222647 A1* | 8/2013 | Ishihara | G06T 15/503 348/239 |
| 2013/0257751 A1 | 10/2013 | Stafford | |
| 2013/0287290 A1* | 10/2013 | Owechko | G06T 17/05 382/154 |
| 2013/0300637 A1 | 11/2013 | Smits et al. | |
| 2013/0307855 A1 | 11/2013 | Lamb et al. | |
| 2013/0326364 A1 | 12/2013 | Latta et al. | |
| 2013/0328927 A1 | 12/2013 | Mount et al. | |
| 2013/0335301 A1 | 12/2013 | Wong | |
| 2013/0335303 A1 | 12/2013 | Maciocci et al. | |
| 2013/0336629 A1 | 12/2013 | Mulholland et al. | |
| 2013/0342564 A1 | 12/2013 | Kinnebrew et al. | |
| 2013/0342570 A1 | 12/2013 | Kinnebrew et al. | |
| 2014/0002444 A1 | 1/2014 | Bennett et al. | |
| 2014/0049559 A1 | 2/2014 | Fleck et al. | |
| 2014/0098009 A1 | 4/2014 | Prest | |
| 2014/0104142 A1 | 4/2014 | Bickerstaff et al. | |
| 2014/0132484 A1* | 5/2014 | Pandey | G02B 27/017 345/8 |
| 2014/0132715 A1* | 5/2014 | Raghoebardayal | G06T 17/00 348/43 |
| 2014/0139639 A1 | 5/2014 | Wagner | |
| 2014/0140579 A1 | 5/2014 | Takemoto | |
| 2014/0168264 A1 | 6/2014 | Harrison | |
| 2014/0176530 A1 | 6/2014 | Pathre | |
| 2014/0184550 A1 | 7/2014 | Hennessey et al. | |
| 2014/0204117 A1 | 7/2014 | Kinnebrew et al. | |
| 2014/0221090 A1 | 8/2014 | Mutschler et al. | |
| 2014/0240351 A1 | 8/2014 | Scavezze et al. | |
| 2014/0253605 A1 | 9/2014 | Border et al. | |
| 2014/0267400 A1 | 9/2014 | Mabbutt | |
| 2014/0363073 A1 | 12/2014 | Shirakyan | |
| 2014/0372957 A1 | 12/2014 | Keane et al. | |
| 2015/0138239 A1 | 5/2015 | Kim | |
| 2015/0143459 A1 | 5/2015 | Molnar | |
| 2015/0145887 A1 | 5/2015 | Forutanpour | |
| 2015/0178956 A1 | 6/2015 | Davis | |
| 2015/0205106 A1 | 7/2015 | Norden | |
| 2015/0243078 A1 | 8/2015 | Watson | |
| 2015/0261293 A1 | 9/2015 | Wilairat | |
| 2015/0356788 A1 | 12/2015 | Abe et al. | |

FOREIGN PATENT DOCUMENTS

| | | |
|---|---|---|
| EP | 1521482 A2 | 4/2005 |
| EP | 2164045 A2 | 3/2010 |
| JP | 2013-238693 | 11/2013 |
| WO | 2009128781 A1 | 10/2009 |
| WO | 2013029097 A2 | 3/2013 |
| WO | 2013052855 A2 | 4/2013 |

(56) References Cited

FOREIGN PATENT DOCUMENTS

| WO | 2013057649 A1 | 4/2013 |
|----|---------------|--------|
| WO | 2013085193 A1 | 6/2013 |
| WO | 2013155217 A1 | 10/2013 |
| WO | 2014188798 A1 | 11/2014 |
| WO | 2015108887 A1 | 7/2015 |

OTHER PUBLICATIONS

Murray, et al., "Comparison of Head Gaze and Head and Eye Gaze within an Immersive Environment", In Tenth IEEE International Symposium on Distributed Simulation and Real-Time Applications, Oct. 2, 2006, 7 pages.

Steptoe, et al., "Eye Tracking for Avatar Eye Gaze Control during Object-Focused Multiparty Interaction in Immersive Collaborative Virtual Environments", In IEEE Virtual Reality Conference, Mar. 14, 2009, 8 pages.

Suma, et al., "Sharing Space in Mixed and Virtual Reality Environments Using a Low-Cost Depth Sensor", In Proceedings of IEEE International Symposium on Virtual Innovation, Mar. 19, 2011, 2 pages.

Ponto, et al., "Perceptual Calibration for Immersive Display Environments", In IEEE Transactions on Visualization and Computer Graphics, vol. 19, Issue 4, Apr. 2013, pp. 691-700, 10 pages.

Li, et al., "On the Anisotropy of Perceived Ground Extents and the Interpretation of Walked Distance as a Measure of Perception", In Journal of Experimental Psychology: Human Perception and Performance, vol. 39, Issue 2, Apr. 2013, 33 pages.

Li, et al., "The Underestimation of Egocentric Distance: Evidence from Frontal Matching Tasks", In Proceedings of Attention, Perception & Psychophysics, Oct. 2011, 15 pages.

Howe, Bo, "Holographic Computer Monitor", Published on: Aug. 18, 2010, Available at: www.youtube.com/watch?v=tHlxj7fY-38, 2 pages.

Angley, Natalie, "Glasses to make you a real-life Tony Stark", Published on: Oct. 31, 2013, Available at: http://edition.cnn.com/2013/10/31/tech/innovation/meta-augmented-reality-glasses/, 4 pages.

Hiner, Jason, "Future iPhone concept: Laser keyboard and holographic display", Published on: Aug. 31, 2011, Available at: http://www.techrepublic.com/blog/tech-sanity-check/future-iphone-concept-laser-keyboard-and-holographic-display/, 6 pages.

Chen, Jian, "A Virtual Environment System for the Comparative Study of Dome and HMD", In Master Thesis, Department of Computer Science, University of Houston, May 2002, 104 pages.

McCarthy, Mike, "HP intros new versions of its mobile and tower workstations", Retrieved on: Sep. 11, 2014, Available at: http://postperspective.com/hp-intros-new-versions-pro-offerings/, 5 pages.

Nakashima, et al., "A 2D-3D Integrated Environment for Cooperative Work", In Proceedings of the Virtual Reality Software and Technology, Nov. 7, 2005, 7 pages.

Pierce, et al., "Image Plane Interaction Techniques in 3D Immersive Environments", In Proceedings of the symposium on Interactive 3D graphics, Apr. 30, 1997, 10 pages.

Regenbrecht, et al., "Interaction in a Collaborative Augmented Reality Environment", In Proceedings of CHI Extended Abstracts on Human Factors in Computing Systems, Apr. 20, 2002, 2 pages.

"Touchscreen interface for seamless data transfer between the real and virtual worlds", Published on: Apr. 15, 2013, Available at: http://www.diginfo.tv/v/13/0025-r-en.php, 8 pages.

Urban, John, "Five Free Tools for Multi-Monitor Computer Set-Ups", Published on: Sep. 16, 2009, Available at: http://sixrevisions.com/tools/five-free-tools-for-multi-monitor-computer-set-ups/, 17 pages.

Steinicke, et al., "Natural Perspective Projections for Head-Mounted Displays", In IEEE Transactions on Visualization and Computer Graphics, Jul. 2011, 12 pages.

Hogue, David, "What Are Index and Alpha Transparency?", Published on: Mar. 3, 2011, Available at: http://www.idux.com/2011/02/27/what-are-index-and-alpha-transparency/, 14 pages.

Jimenez, et al., "Gaze-based Interaction for Virtual Environments", In Journal of Universal Computer Science, vol. 14, Issue 19, Nov. 2008, 14 pages.

Kinoshita, et al., "A Fast and Robust 3D Head Pose and Gaze Estimation System", In 8th IEEE International Conference onAutomatic Face & Gesture Recognition, Sep. 17, 2008, 2 pages.

Peterson, et al., "Evaluation of Alternative Label Placement Techniques in Dynamic Virtual Environments", In Proceedings of the 10th International Symposium on Smart Graphics, May 22, 2009, 7 pages.

Kuhl, et al., "HMD Calibration and its Effects on Distance Judgments", In Proceedings of the 5th symposium on Applied perception in graphics and visualization, Aug. 9, 2008, 24 pages.

Kim. et al., "3D Reconstruction of Stereo Images for Interaction between Real and Virtual Worlds", In Proceedings of the Second IEEE and ACM International Symposium on Mixed and Augmented Reality, Oct. 7, 2003, 9 pages.

Amar, et al., "Synthesizing Reality for Realistic Physical Behavior of Virtual Objects in Augmented Reality Applications for Smart-Phones", In Proceedings of IEEE Virtual Reality, Mar. 16, 2013, pp. 123-124, 2 pages.

Lavoie, et al., "Constructing 3D Virtual Reality Objects from 2D Images of Real Objects Using NURBS", In Proceedings of IEEE International Conference on Virtual Environments, Human-Computer Interfaces, and Measurement Systems Ostuni, Jun. 25, 2007, 8 pages.

Nóbrega, et al., "Magnetic Augmented Reality: Virtual Objects in Your Space", In Proceedings of the International Working Conference on Advanced Visual Interfaces, May 21, 2012, pp. 332-335, 4 pages.

Izadi, et al., "KinectFusion: Real-time 3D Reconstruction and Interaction Using a Moving Depth Camera", In Proceedings of the 24th annual ACM symposium on User interface software and technolgy, Oct. 16, 2011, 10 pages.

Kalkofen, et al., "Visualization Techniques for Augmented Reality", In Proceedings of Handbook of Augmented Reality, Jul. 13, 2011, pp. 65-98, 34 pages.

Maimone, et al., "Computational Augmented Reality Eyeglasses", In Proceedings of IEEE International Symposium on Mixed and Augmented Reality, Oct. 1, 2013, 10 pages.

"Virtual Reality (VR) and Mixed Reality (MR) technologies", Retrieved on: Sep. 12, 2014, Available at: http://www.vr-hyperspace.eu/about-vr-hyperspace/technology/77-virtual-reality-vr-and-mixed-reality-mr-technologies (5 pages total).

"International Search Report and Written Opinion Issued in PCT Patent Application No. PCT/US2015/041861", dated Oct. 30, 2015, (11 pages total).

"International Search Report and Written Opinion Issued in PCT Application No. PCT/US2015/041867", dated Nov. 25, 2015, (11 Pages total).

"International Search Report & Written Opinion Issued in PCT Application No. PCT/US2015/041862", dated Nov. 16, 2015, (11 Pages total).

"International Search Report and Written Opinion Issued in PCT Application No. PCT/US2015/041865", dated Jan. 25, 2016, 12 Pages.

"International Search Report & Written Opinion Issued in PCT Patent Application No. PCT/US2015/041866", date Nov. 27, 2015, 12 Pages.

"International Search Report & Written Opinion Received for PCT Application No. PCT/US2015/041863", dated Nov. 16, 2015, (12 Pages total).

"International Preliminary Report on Patentability Issued in PCT Application No. PCT/US2015/041868", dated Oct. 28, 2015, (10 Pages total).

"International Preliminary Report on Patentability Issued in PCT Application No. PCT/US2015/041864", dated Oct. 26, 2015, (11 Pages total).

"Second Written Opinion Issued in PCT Application No. PCT/US2015/041866", dated Jun. 27, 2016, 7 Pages.

(56) References Cited

OTHER PUBLICATIONS

"Second Written Opinion Issued in PCT Application No. PCT/US2015/041865", dated Jun. 15, 2016, 8 Pages.
"Second Written Opinion Issued in PCT Application No. PCT/US2015/041868", dated Jul. 1, 2016, (6 Pages).
"Second Written Opinion Issued in PCT Application No. PCT/US2015/041862", dated Jun. 13, 2016, 5 Pages.
Duchowski, Andrew, "Chapter 7—Head-Mounted System Software Development", In Book Eye Tracking Methodology, Theory and Practice, Part 2, Jan. 1, 2007, pp. 69-86. (18 pages total).
"Second Written Opinion Issued in PCT Application No. PCT/US2015/041861", dated Jun. 20, 2016, 6 Pages.
"Second Written Opinion Issued in PCT Application No. PCT/US2015/041863", dated Jun. 15, 2016, 7 Pages.
"Gaze Awareness for Videoconferencing: A Software Approach" (by Jim Gemmell and Kentaro Toyama, Microsoft; C. Lawrence Zitnick and Thomas Kang, Carnegie Mellon University; Steven Seitz, University of Washington, in 1070-986X/00$10.00 © 2000 IEEE)( 10 pages total).
"International Preliminary Report on Patentability Issued in PCT Application No. PCT/US2015/041868", dated Oct. 13, 2016, 8 Pages.
"International Preliminary Report on Patentability Issued in PCT Application No. PCT/US2015/041863", dated Oct. 13, 2016, 8 Pages.
"International Preliminary Report on Patentability Issued in PCT Application No. PCT/US2015/041862", dated Oct. 13, 2016, 6 Pages.
"International Preliminary Report on Patentability Issued in PCT Application No. PCT/US2015/041861", dated Oct. 13, 2016, 7 Pages.
"International Preliminary Report on Patentability Issued in PCT Application No. PCT/US2015/041865", dated Oct. 19, 2016, 7 Pages.
"International Preliminary Report on Patentability Issued in PCT Application No. PCT/US2015/041866", dated Oct. 27, 2016, 9 Pages.

\* cited by examiner

VIRTUAL REALITY ENVIRONMENT WITH REAL WORLD OBJECTS

STATEMENT OF RELATED APPLICATIONS

This application claims benefit and priority to U.S. Provisional Application Ser. No. 62/029,351 filed Jul. 25, 2014, entitled "Head Mounted Display Experiences" which is incorporated herein by reference in its entirety.

BACKGROUND

Mixed-reality computing devices, such as head mounted display (HMD) systems and handheld mobile devices (e.g. smart phones, tablet computers, etc.), may be configured to display information to a user about virtual and/or real objects in the field of view of the user and/or a field of view of a camera of the device. For example, an HMD device may be configured to display—using a see-through display system or an opaque display system with camera pass-through or other outward sensor—virtual environments with real world objects mixed in, or real world environments with virtual objects mixed in. Similarly, a mobile device may display such information using a camera viewfinder window.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An HMD device renders a virtual reality environment in which areas of the real world are masked out so that real world objects such as computer monitors, doors, people, faces, and the like appear visible to the device user and no holographic or virtual reality content is rendered over the visible objects. The HMD device includes a sensor package to support application of surface reconstruction techniques to dynamically detect edges and surfaces of the real world objects and keep objects visible on the display as the user changes position or head pose or when the real world objects move or their positions are changed. The HMD device can expose controls to enable the user to select which real world objects are visible in the virtual reality environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
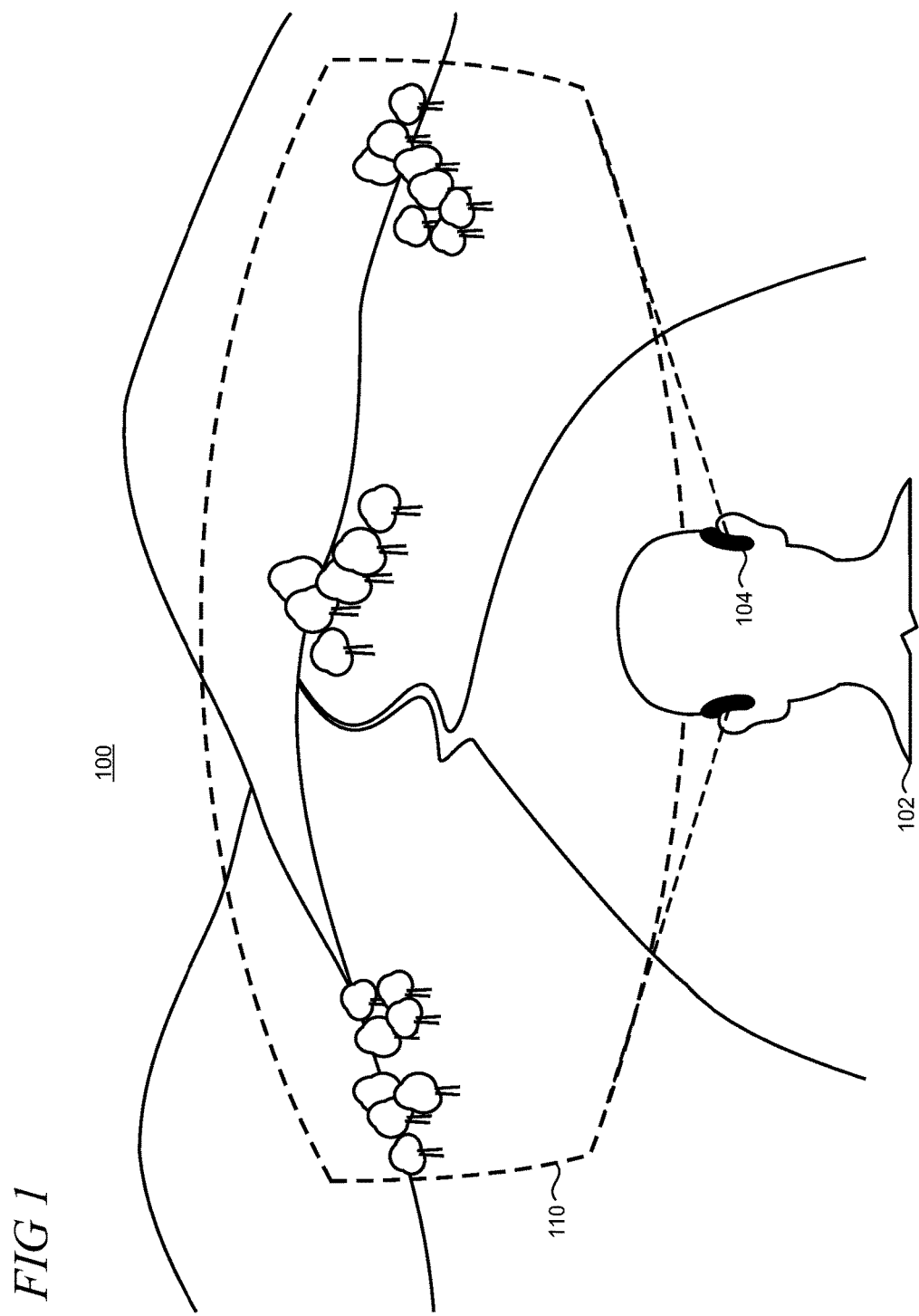
FIG. 1 shows an illustrative virtual reality environment, a portion of which is rendered within the field of view of a user of an HMD device.
Figure 2:
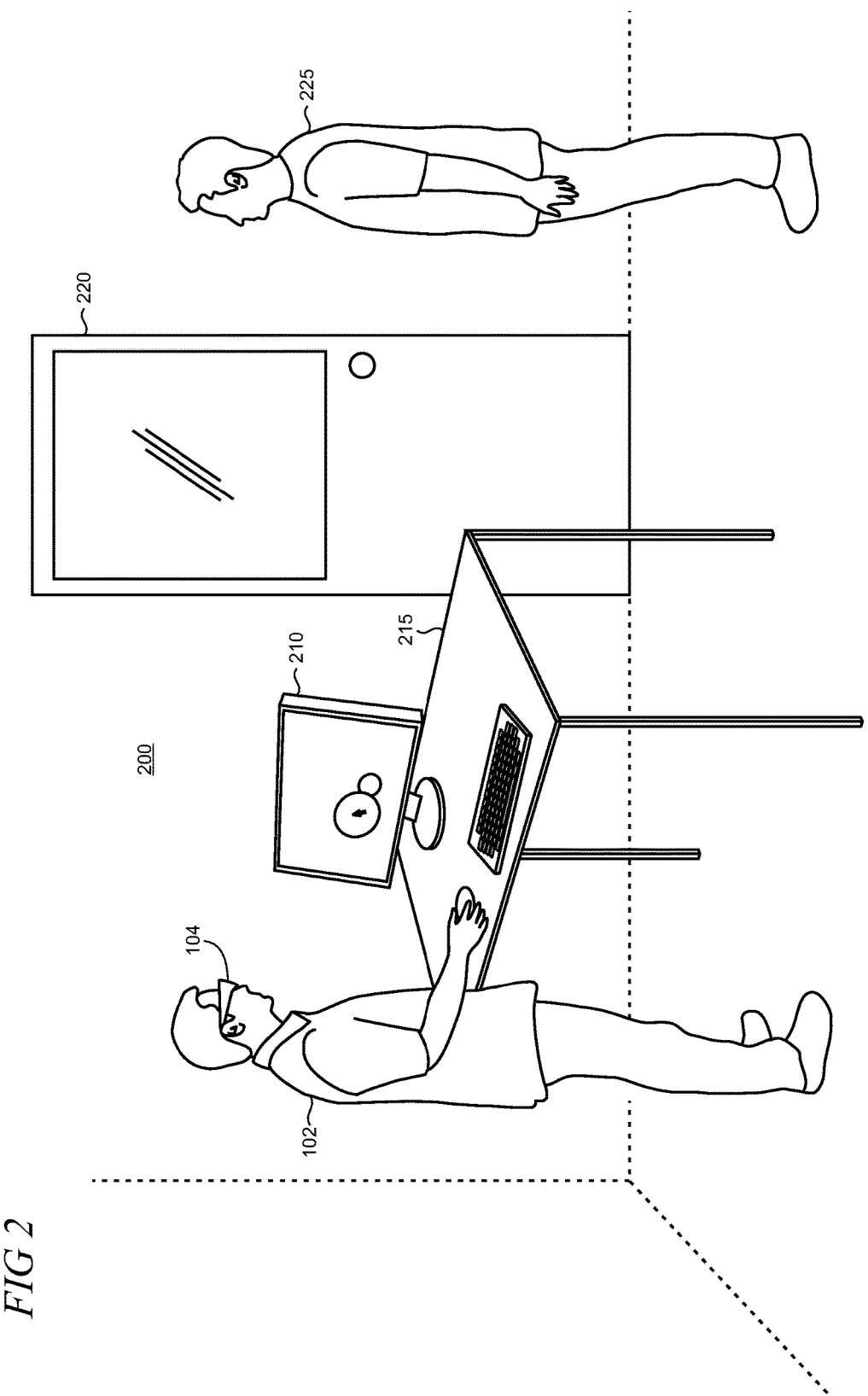
FIG. 2 shows an illustrative real world environment in which a user of an HMD device is located.

Users can typically explore, navigate, interact with, and move within a virtual reality environment rendered by an HMD device when located within an associated physical, real world environment. An illustrative virtual reality environment 100 is shown in FIG. 1 and an illustrative physical, real world environment 200 is shown in FIG. 2. The user 102 employs an HMD device 104 to experience the virtual reality environment 100 that is rendered visually on an optics display and may include audio and/or tactile/haptic sensations in some implementations. In this particular non-limiting example, the virtual reality environment 100 includes an outdoor landscape with which the user 102 can interact and see. As the user changes the position or orientation of his head and/or moves within the real world environment, his view of the virtual reality environment can change. The field of view (represented by the dashed area 110 in FIG. 1) can be sized and shaped and other characteristics of the device can be controlled to make the HMD device experience visually immersive to provide the user with a strong sense of presence in the virtual reality environment.

As shown in FIG. 2, the physical, real world environment 200 includes real world objects including a computer monitor 210 on a work surface 215. A door 220 is also located in the environment 200 as well as another person 225 (e.g., a friend or colleague of the user 102).

Figure 3:
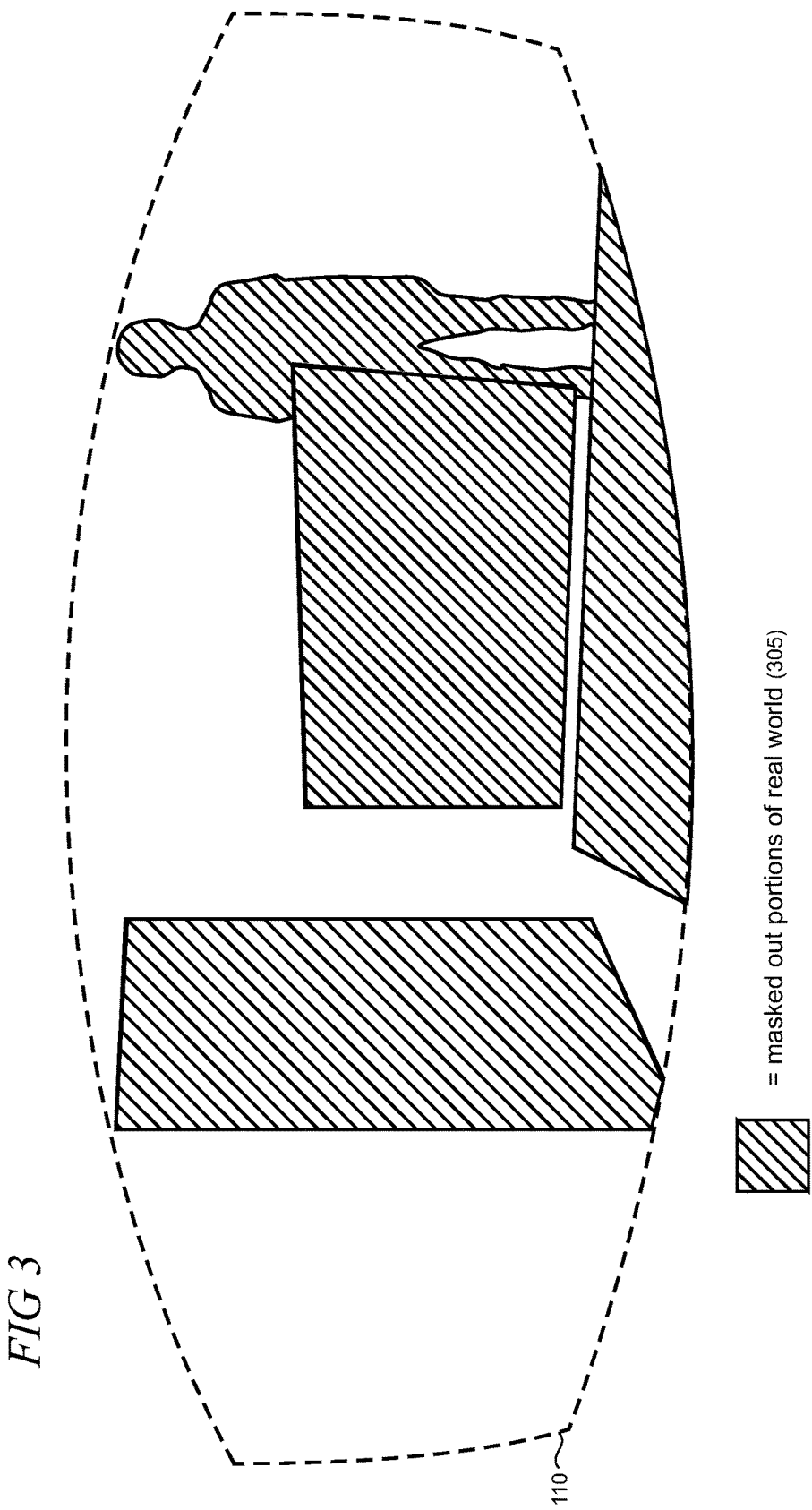
FIG. 3 shows a virtual world displayed in the field of view of an HMD device having masked out portions into which no holographic content is rendered.
Figure 4:
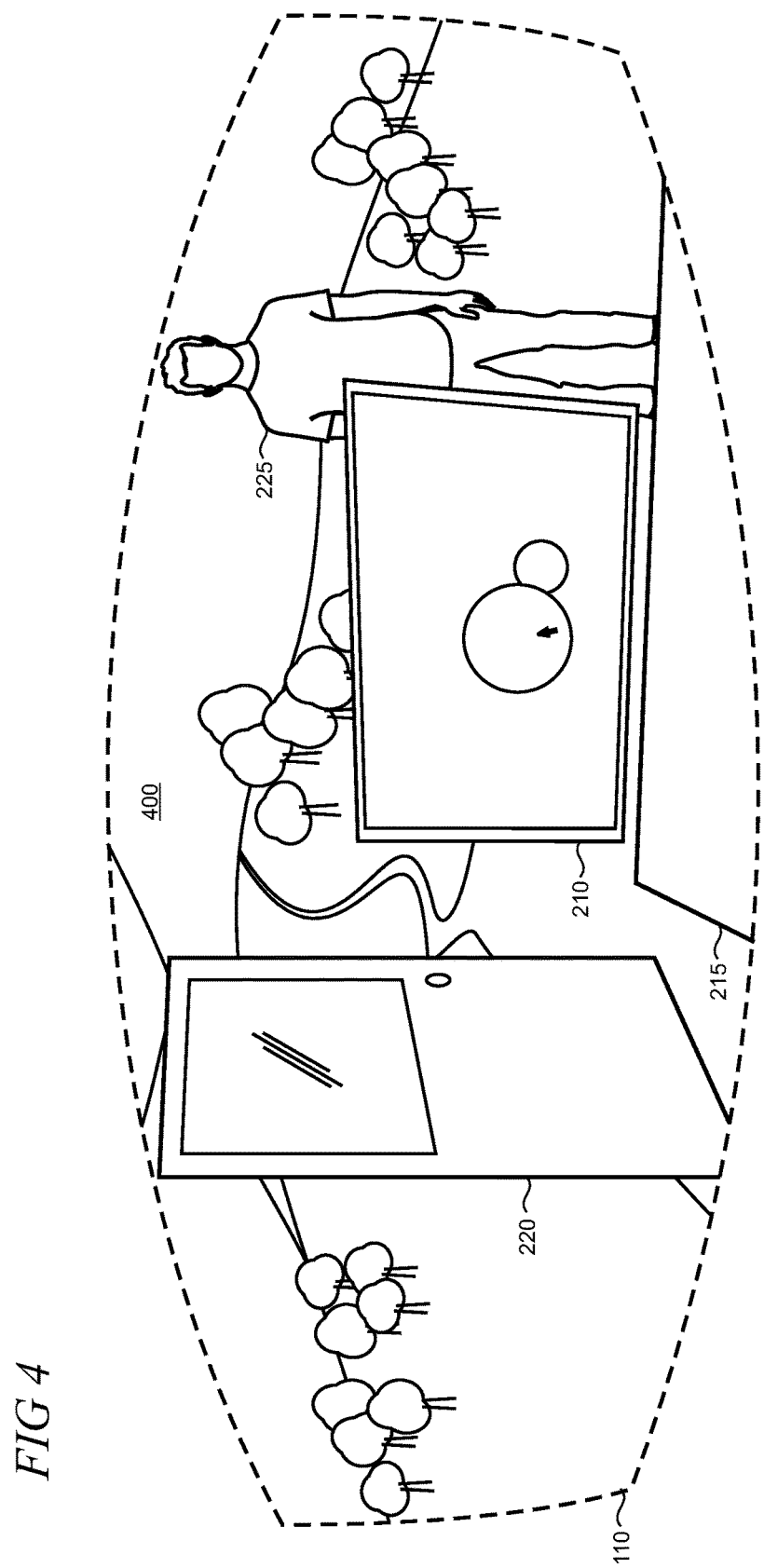
FIG. 4 shows a virtual world displayed in the field of view of an HMD device in which portions of the real world appear in the masked out areas of the virtual world.

The HMD device 104 is typically configured to mask out certain areas of the real world on the HMD device's display so that no holograms or virtual reality content is rendered into the masked out areas. That is, the masked out real world is rendered on the HMD display in augmented-reality, but is otherwise decoupled from the elements in the virtual world and interaction between the worlds is limited. For example, if the virtual world supports a game experience, a monitor masked out from the real world does not necessarily need to be utilized to support gameplay. The monitor could instead be showing, for example, streaming video that is not related to gameplay in the virtual world. In alternative implementations, exceptions may be permitted in which some holographic content can be rendered into the masked out areas under particular circumstances. For example, holograms that impart urgent or prioritized messages or other important content may be rendered without consideration of the masked out areas, or in ways that limit the intrusion into the masked areas while still allowing the rendered holographic content to receive the user's attention. In other examples, user-selectable options can be provided to enable the user to select categories or types of holographic content that is renderable into masked out areas on an exception basis. Such holographic content categories and types can vary by application. FIG. 3 shows various masked out areas 305 of the real world in the field of view 110 of the device 104. The masked out areas correspond to portions of the real world that remain visible on the display, as shown in FIG. 4, in the mixed-reality environment 400 that is rendered in the current field of view 110 (where a mixed-reality environment includes both virtual and real world objects).

In this particular illustrative example, the monitor 210, work surface 215, door 220, and person 225 are masked out from the real world. Accordingly, the user 102 can see both the real world objects along with parts of the virtual outdoor landscape, as shown in FIG. 4. It is noted that while both the face and body of the person 225 is displayed in this example, the HMD device can be configured to selectively display just portions of the person, such as the face, in alternative implementations.

The masking and displaying of real world objects is typically dynamically performed so that the objects appropriately maintain their context within the mixed-reality environment as the user's view position changes and/or the objects move or change position within the physical environment 200. For example, when the person moves, the door is opened/closed, the monitor is repositioned, etc., the masking and displaying is refreshed to enable the mixed-reality environment to maintain a holographic geometry in which no holograms or other virtual content is rendered in front of or behind the displayed real world objects.

Figure 5:
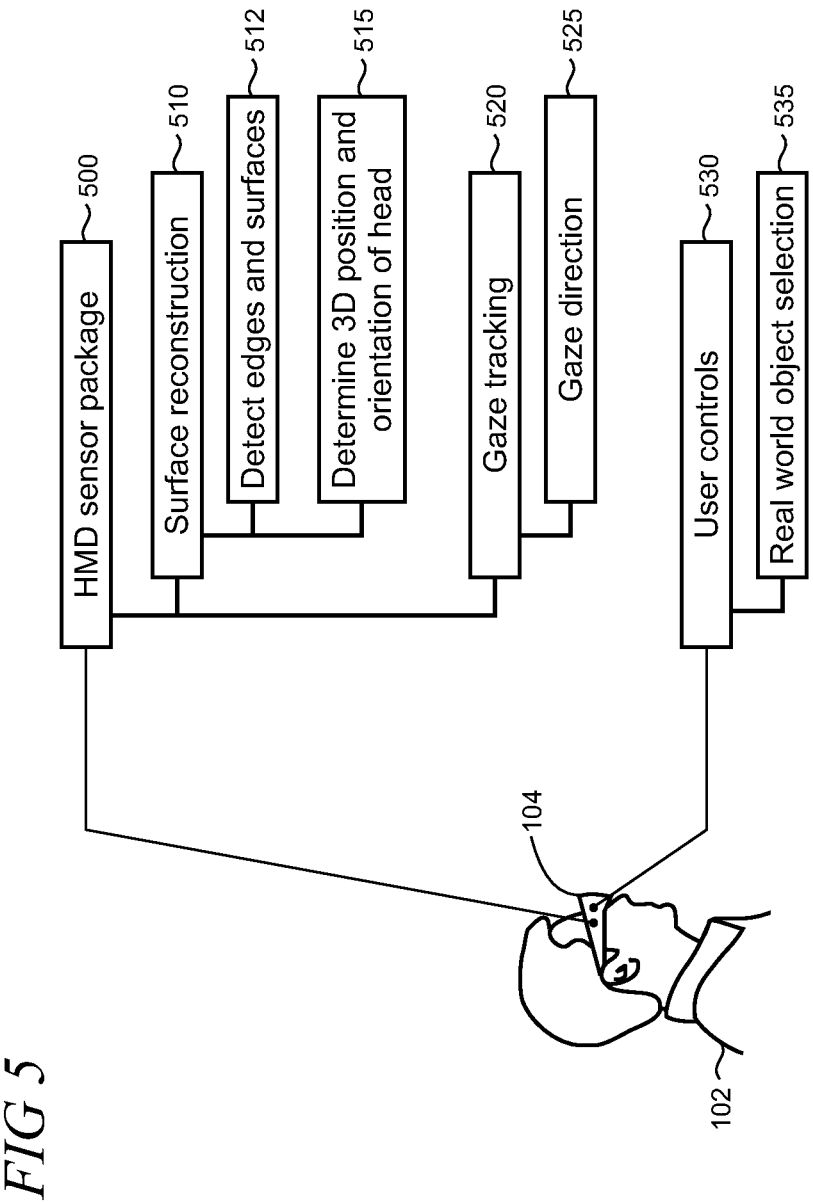
FIG. 5 shows user controls exposed by an HMD device and illustrative data provided by an HMD sensor package.
Figure 6:
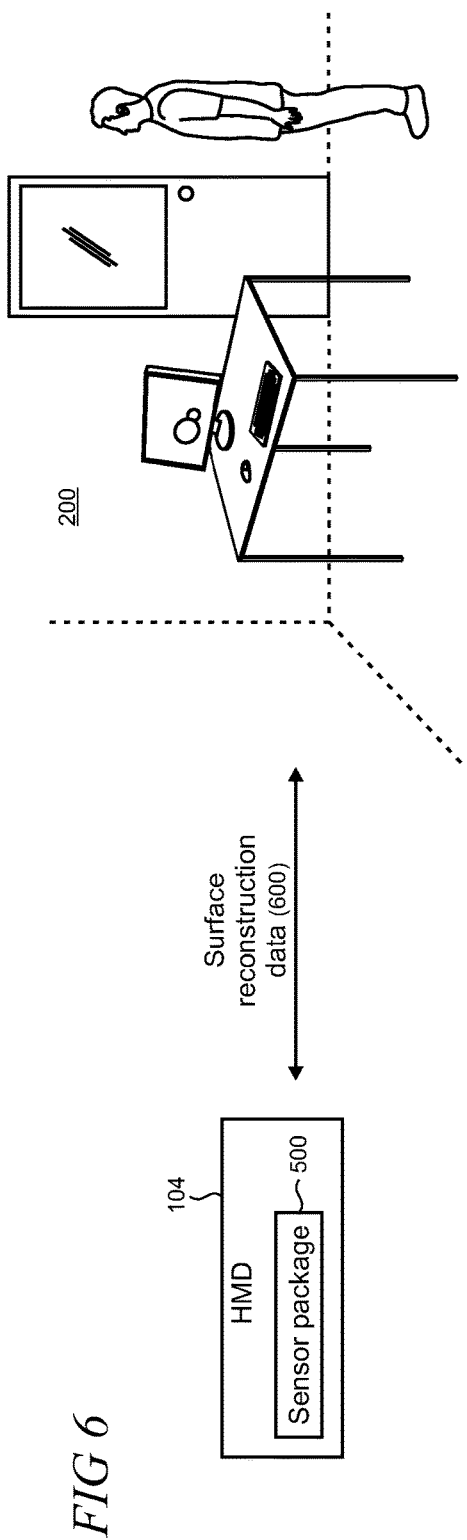
FIG. 6 depicts surface reconstruction data associated with real world objects being captured by an HMD device.

As shown in FIGS. 5 and 6, the HMD device 104 is configured with a sensor package 500. Exemplary sensors are described in more detail below. As shown in FIG. 5, the sensor package 500 can support various functionalities including surface reconstruction 510. Surface reconstruction may be utilized, for example, to detect edges and surfaces 512 and for head tracking to determine the 3D (three-dimensional) position and orientation 515 of the user's head within the physical real world environment 200. As shown in FIG. 6, surface reconstruction data 600 is obtained using the sensor package 500 and may be utilized to detect edges and surfaces associated with real world objects in the physical real world environment 200 and identify their location within the environment so that some of the objects can be masked out from the real world and shown in the mixed-reality environment. In alternative implementations, depth data for surface reconstruction can be derived using suitable stereoscopic image analysis techniques. Some areas of the real world can also be explicitly masked out, without using remote object sensing, or a combination of sensor-based masking and explicit masking may be utilized. The sensor package can also support gaze tracking 520 to ascertain a direction of the user's gaze 525 which may be used along with the head position and orientation data in some implementations.

The HMD device 104 may further be configured to expose one or more user controls 530 to enable selection 535 of real world objects to be visible in the mixed-reality environment. For example, the controls 530 may facilitate the user 102 to select the monitor as a real world object that is to be masked out and remain visible in the mixed-reality environment. A variety of selection methodologies can be utilized such as the user looking at a real world object (i.e., a projected gaze vector from the viewing position intersects the object) and then interacting with a control or interface to indicate its selection. Controls can include buttons (which can be physical or virtual), interactive menus, as well as interfaces that enable use of user voice commands or natural language instructions, gestures, and the like. Alternative selection methodologies include the HMD device presenting detected real world objects in a list, menu, or other suitable form from which the user may choose for masking out and visibility in the displayed mixed-reality environment.

Figure 7:
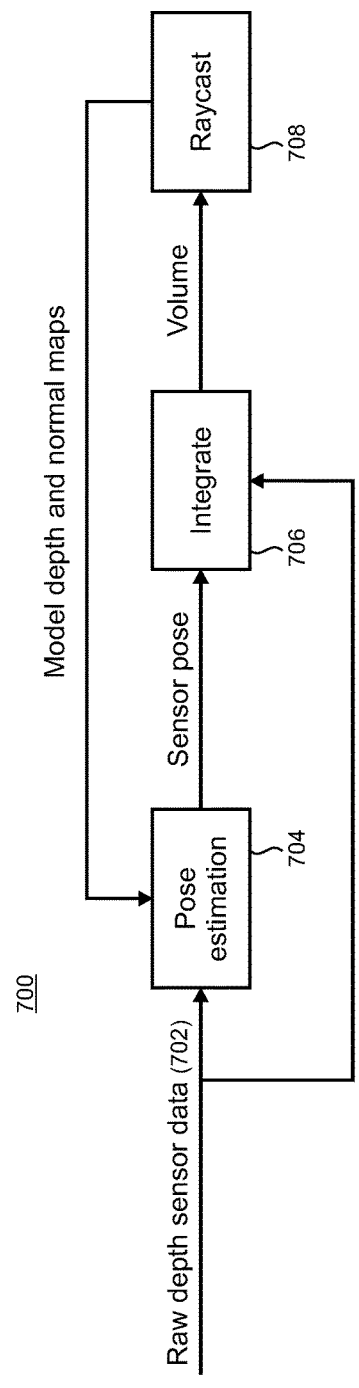
FIG. 7 shows a block diagram of an illustrative surface reconstruction pipeline.

FIG. 7 shows an illustrative surface reconstruction data pipeline 700 for obtaining surface reconstruction data for objects in the real world environment. It is emphasized that the disclosed technique is illustrative and that other techniques and methodologies may be utilized depending on the requirements of a particular implementation. Raw depth sensor data 702 is input into a 3D (three-dimensional) pose estimate of the sensor (block 704). Sensor pose tracking can be achieved, for example, using ICP (iterative closest point) alignment between the predicted surface and current sensor measurement. Each depth measurement of the sensor can be integrated (block 706) into a volumetric representation using, for example, surfaces encoded as a signed distance field (SDF). Using a loop, the SDF is raycast (block 708) into the estimated frame to provide a dense surface prediction to which the depth map is aligned. Thus, when the user 102 looks around the virtual world, surface reconstruction data associated with the real world environment 200 (FIG. 2) can be collected and analyzed to determine the user's head position and orientation within the environment.

Figure 8:
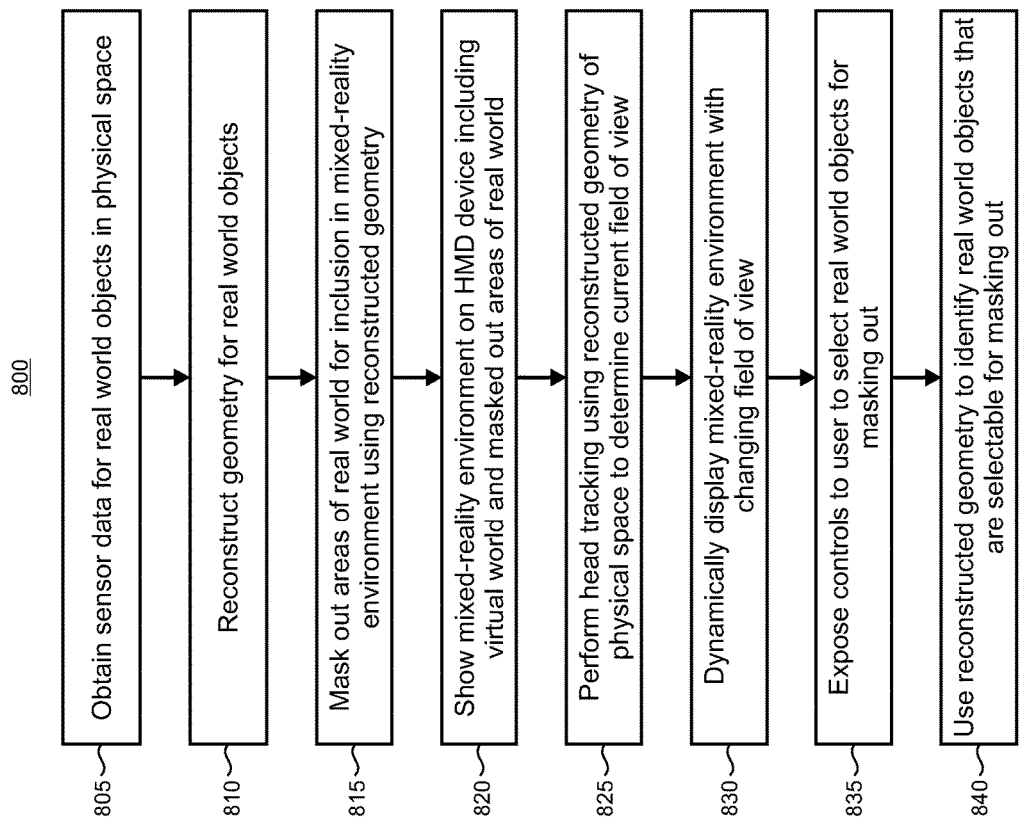
FIGS. 8, 9, and 10 are flowcharts of illustrative methods that may be performed using an HMD device.
Figure 9:
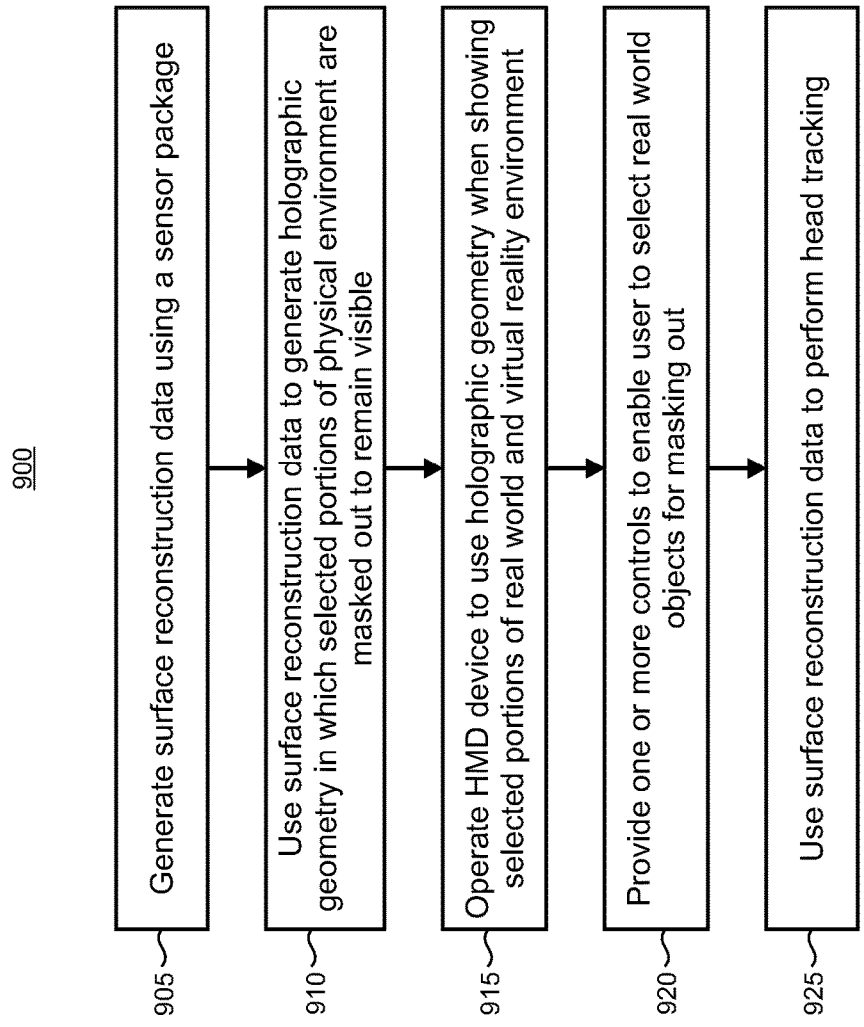
Figure 10:
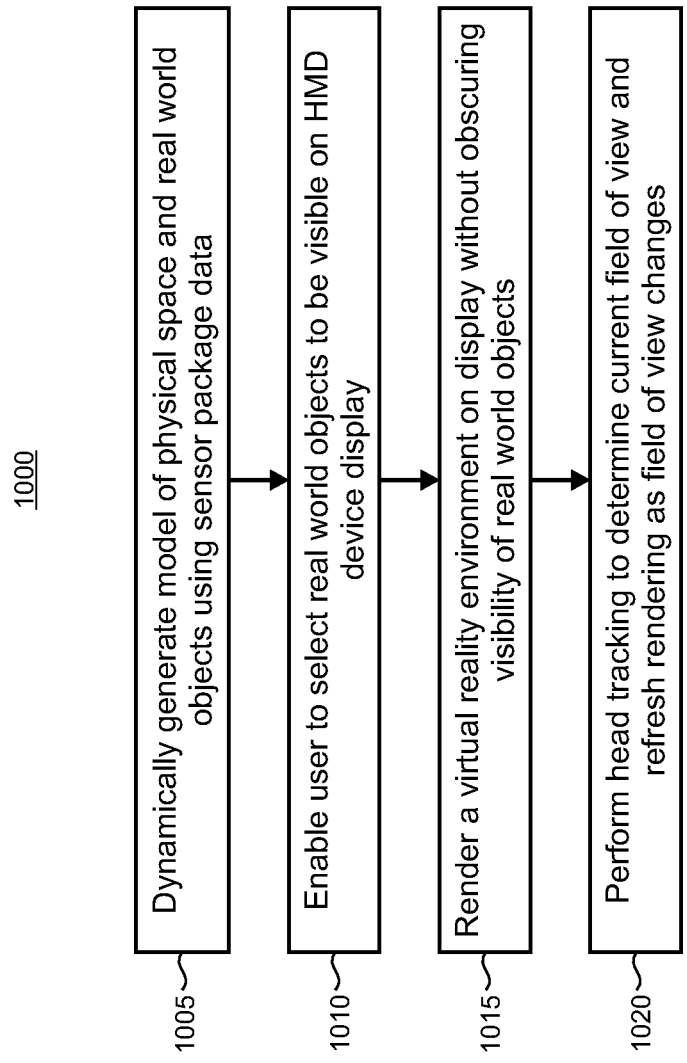

FIGS. 8, 9, and 10 are flowcharts of illustrative methods that may be performed using the HMD device 104. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Method 800 in FIG. 8 may be performed by an HMD device that supports rendering of a mixed-reality environment. In step 805, sensor data is obtained that describes or otherwise is associated with one or more real world objects in a physical environment that adjoins an HMD device user. The sensor data can include, for example, depth data using a depth sensor that is integrated into the HMD device or be obtained from an external sensor or source. Depth-from-stereo imaging analyses may also be used to create depth data. In step 810, the sensor data is used to reconstruct a geometry of the real world objects, for example, using surface reconstruction.

In step 815, using the reconstructed geometry, areas of the real world are masked out for inclusion in the mixed-reality environment and the masked out areas of the real world are shown along with a virtual reality environment in step 820. In step 825, a reconstructed geometry of the physical environment is generated to perform head tracking to determine a current field of view. In step 830, the display of the mixed-reality environment is typically dynamically refreshed as the user's view changes, for example, by changing head pose, or by moving through the physical environment.

In step 835, the HMD device can expose controls to enable the user to select real world objects for masking out. In step 840, the reconstructed geometry may be used to identify real world objects that are selectable by the user for masking out. The HMD device can apply some intelligence to locate and identify objects that are likely good candidates for masking out depending on the particular context of a given mixed-reality application. For example, in computer-aided design (CAD) applications, a monitor is likely to be an object that the user desires to mask out from the real world.

Method 900 in FIG. 9 may be performed by an HMD device having one or more processors, a display for rendering a mixed-reality environment using a variable field of view, and one or more memory devices that store computer-readable instructions such as software code that can be utilized to implement the method. In step 905, surface reconstruction data of a physical environment and real world objects is generated using a sensor package that is incorporated into the HMD device which may include a depth sensor or camera system. Various suitable surface reconstruction techniques may be utilized including that shown in the pipeline in FIG. 7 in which multiple overlapping surfaces are integrated. In step 910, the surface reconstruction data is used to generate a holographic geometry in which selected portions of the physical environment are masked out to remain visible on the device display.

In step 915, the HMD device is operated to use the holographic geometry when showing the selected portions of the real world and the virtual reality environment. The operation is performed so that holographic content is prevented from being rendered in front of, or behind, the holographic geometry. In step 920, one or more controls can be provided to user to select the objects to be masked out from the real world. In step 925, the surface reconstruction data may be used to perform head tracking so that the appropriate contextual relationship between the holographic geometry and the rendered virtual reality environment is maintained as the user's head pose or position changes.

Method 1000 in FIG. 10 may be performed by instructions stored on an HMD device operating in a physical environment and having a display that renders a virtual reality environment. In step 1005, a surface reconstruction model of the physical environment and real world objects contained therein is dynamically generated using data from a sensor package onboard the HMD device. The model can be updated, for example, on a frame-by-frame or other suitable basis, as the user moves within the physical environment. In step 1010, the HMD device user is enabled to select the real world objects that are to remain visible on the device display. For example, tracking of a projected gaze of the user may be performed to determine that the user is looking at a particular real world object. A selection instruction can be received such as control actuation, voice command, natural language interaction, or gesture. In step 1015, a virtual reality environment is rendered on the display in a manner that does not obscure visibility of the selected real world objects. In step 1020, head tracking is performed using the surface reconstruction model to determine a current field of view and the rendering is refreshed as the field of view changes.

Figure 11:
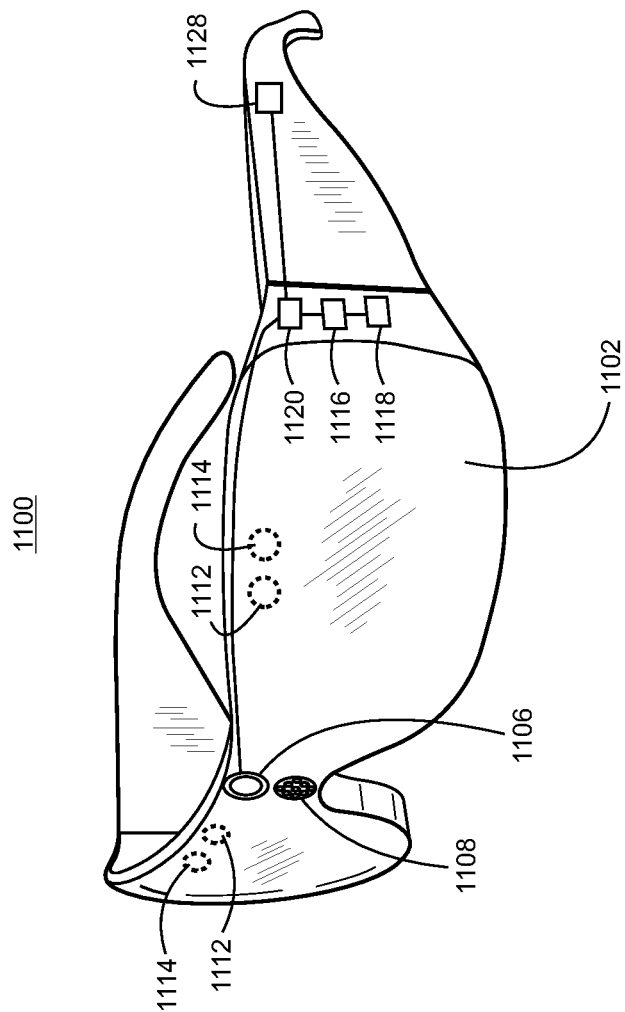
FIG. 11 is a pictorial view of an illustrative example of a virtual reality HMD device.
Figure 12:
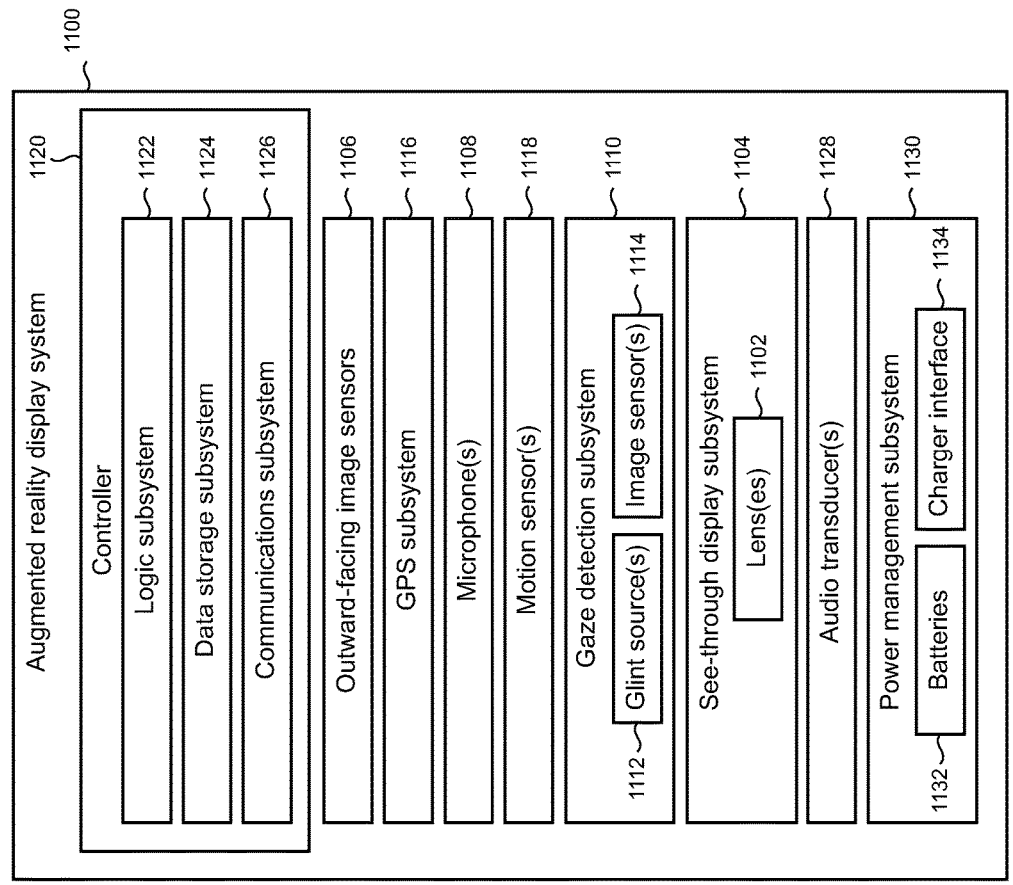
FIG. 12 shows a functional block diagram of an illustrative example of a virtual reality HMD device.
Figure 13:
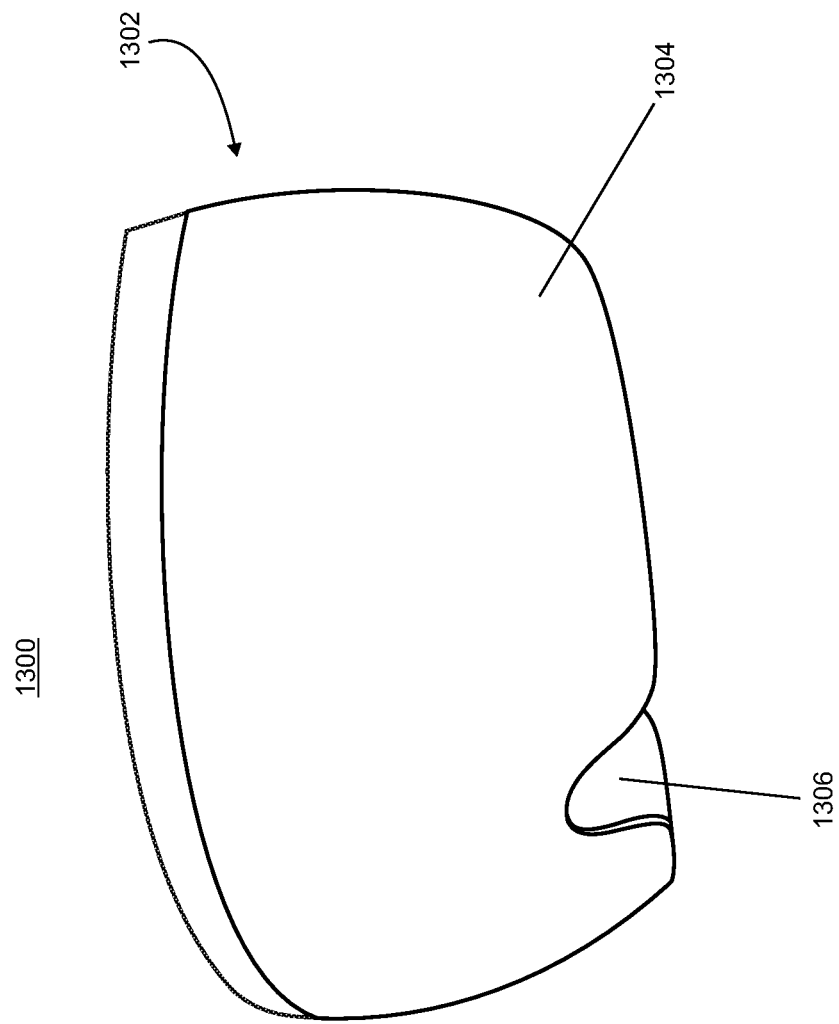
FIGS. 13 and 14 are pictorial front views of an illustrative sealed visor that may be used as a component of a virtual reality HMD device.
Figure 14:
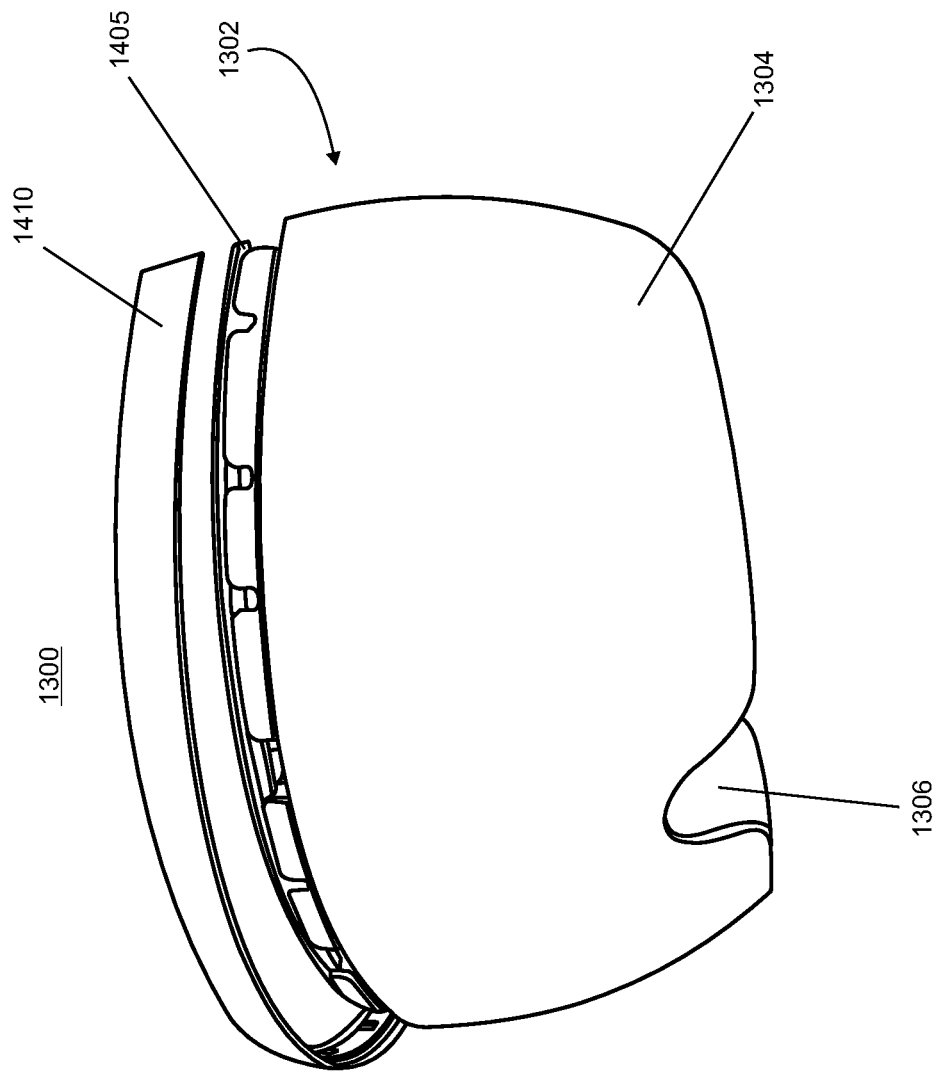

Turning now to various illustrative implementation details, a mixed reality display device according to the present arrangement may take any suitable form, including but not limited to near-eye devices such as the HMD device 104 and/or other portable/mobile devices. A see-through display may be used in some implementations while an opaque (i.e., non-see-through) display using a camera-based pass-through or outward facing sensor, for example, may be used in other implementations. FIG. 11 shows one particular illustrative example of a see-through, mixed reality display system 1100, and FIG. 12 shows a functional block diagram of the system 1100. Display system 1100 comprises one or more lenses 1102 that form a part of a see-through display subsystem 1104, such that images may be displayed using lenses 1102 (e.g. using projection onto lenses 1102, one or more waveguide systems incorporated into the lenses 1102, and/or in any other suitable manner). Display system 1100 further comprises one or more outward-facing image sensors 1106 configured to acquire images of a background scene and/or physical environment being viewed by a user, and may include one or more microphones 1108 configured to detect sounds, such as voice commands from a user. Outward-facing image sensors 1106 may include one or more depth sensors and/or one or more two-dimensional image sensors. In alternative arrangements, as noted above, a mixed reality display system, instead of incorporating a see-through display subsystem, may display mixed reality images through a viewfinder mode for an outward-facing image sensor.

The display system 1100 may further include a gaze detection subsystem 1110 configured for detecting a direction of gaze of each eye of a user or a direction or location of focus, as described above. Gaze detection subsystem 1110 may be configured to determine gaze directions of each of a user's eyes in any suitable manner. For example, in the illustrative example shown, a gaze detection subsystem 1110 includes one or more glint sources 1112, such as infrared light sources, that are configured to cause a glint of light to reflect from each eyeball of a user, and one or more image sensors 1114, such as inward-facing sensors, that are configured to capture an image of each eyeball of the user. Changes in the glints from the user's eyeballs and/or a location of a user's pupil, as determined from image data gathered using the image sensor(s) 1114, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1110 may have any suitable number and arrangement of light sources and image sensors. In some implementations, the gaze detection subsystem 1110 may be omitted.

The display system 1100 may also include additional sensors. For example, display system 1100 may comprise a global positioning system (GPS) subsystem 1116 to allow a location of the display system 1100 to be determined. This may help to identify real world objects, such as buildings, etc. that may be located in the user's adjoining physical environment.

The display system 1100 may further include one or more motion sensors 1118 (e.g., inertial, multi-axis gyroscopic or acceleration sensors) to detect movement and position/orientation/pose of a user's head when the user is wearing the system as part of a mixed-reality HMD device. Motion data may be used, potentially along with eye-tracking glint data and outward-facing image data, for gaze detection, as well as for image stabilization to help correct for blur in images from the outward-facing image sensor(s) 1106. The use of motion data may allow changes in gaze location to be tracked even if image data from outward-facing image sensor(s) 1106 cannot be resolved.

In addition, motion sensors 1118, as well as microphone(s) 1108 and gaze detection subsystem 1110, also may be employed as user input devices, such that a user may interact with the display system 1100 via gestures of the eye, neck and/or head, as well as via verbal commands in some cases. It may be understood that sensors illustrated in FIGS. 11 and 12 and described in the accompanying text are included for the purpose of example and are not intended to be limiting in any manner, as any other suitable sensors and/or combination of sensors may be utilized to meet the needs of a particular implementation of a mixed-reality reality HMD device. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1100 can further include a controller 1120 having a logic subsystem 1122 and a data storage subsystem 1124 in communication with the sensors, gaze detection subsystem 1110, display subsystem 1104, and/or other components through a communications subsystem 1126. The communications subsystem 1126 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1124 may include instructions stored thereon that are executable by logic subsystem 1122, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1100 is configured with one or more audio transducers 1128 (e.g., speakers, earphones, etc.) so that audio can be utilized as part of a mixed-reality experience. A power management subsystem 1130 may include one or more batteries 1132 and/or protection circuit modules (PCMs) and an associated charger interface 1134 and/or remote power interface for supplying power to components in the display system 1100.

It may be appreciated that the depicted display devices 104 and 1100 are described for the purpose of example, and thus are not meant to be limiting. It is to be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

FIGS. 13-18 show an illustrative alternative implementation for a mixed-reality display system 1300 that may be used as a component of an HMD device. In this example, the system 1300 uses a see-through sealed visor 1302 that is configured to protect the internal optics assembly utilized for the see-through display subsystem. The visor 1302 is typically interfaced with other components of the HMD device (not shown) such as head mounting/retention systems and other subsystems including sensors, power management, controllers, etc., as illustratively described in conjunction with FIGS. 11 and 12. Suitable interface elements (not shown) including snaps, bosses, screws and other fasteners, etc. may also be incorporated into the visor 1302.

The visor includes see-through front and rear shields 1304 and 1306 respectively that can be molded using transparent materials to facilitate unobstructed vision to the optical displays and the surrounding real world environment. Treatments may be applied to the front and rear shields such as tinting, mirroring, anti-reflective, anti-fog, and other coatings, and various colors and finishes may also be utilized. The front and rear shields are affixed to a chassis 1405 as depicted in the partially exploded view in FIG. 14 in which a shield cover 1410 is shown as disassembled from the visor 1302.

The sealed visor 1302 can physically protect sensitive internal components, including an optics display subassembly 1502 (shown in the disassembled view in FIG. 15) when the HMD device is worn and used in operation and during normal handling for cleaning and the like. The visor 1302 can also protect the optics display subassembly 1502 from environmental elements and damage should the HMD device be dropped or bumped, impacted, etc. The optics display subassembly 1502 is mounted within the sealed visor in such a way that the shields do not contact the subassembly when deflected upon drop or impact.

Figure 15:
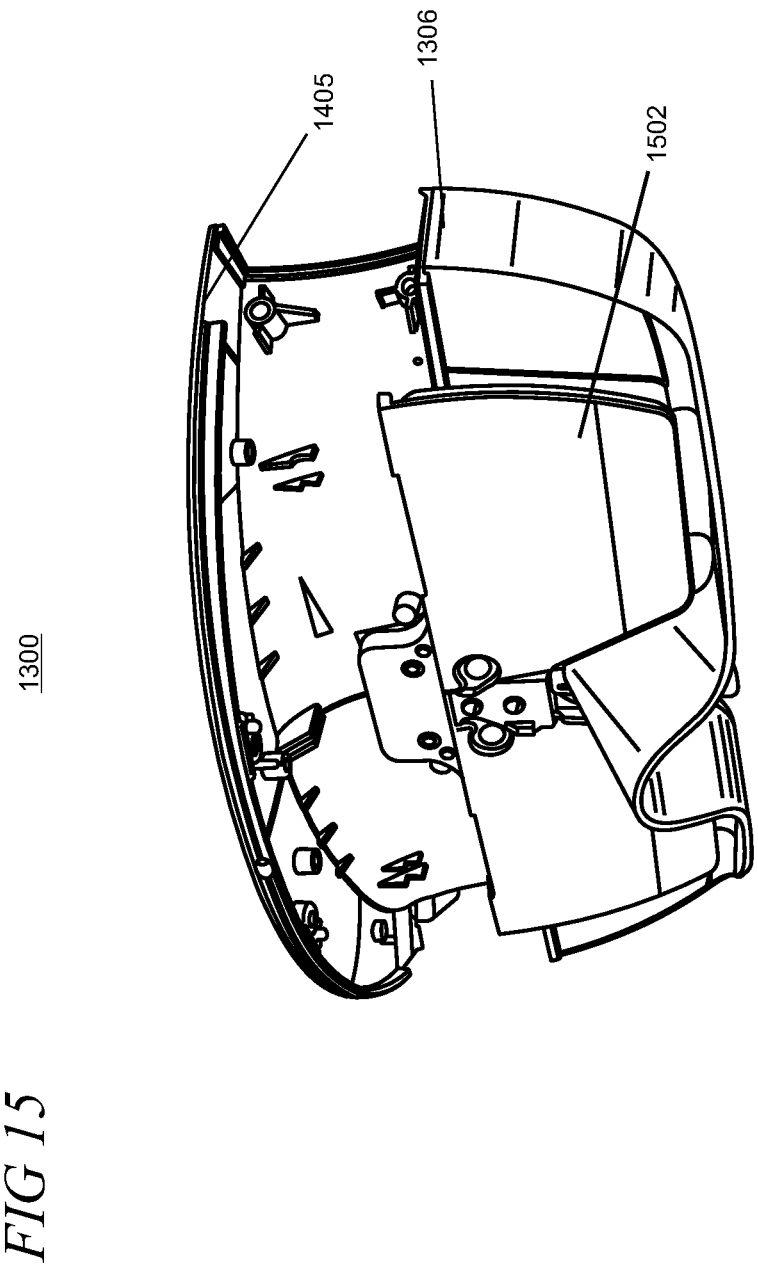
FIG. 15 shows a view of the sealed visor when partially disassembled.
Figure 16:
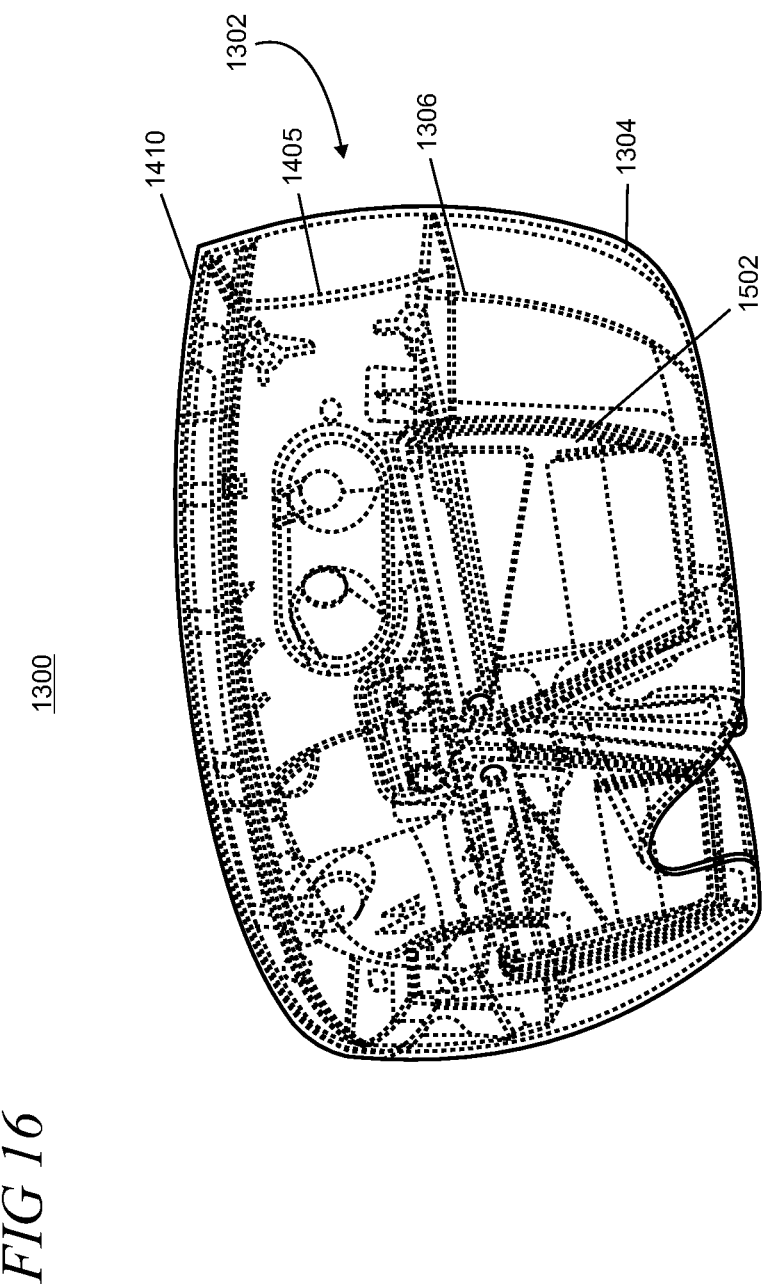
FIG. 16 shows a phantom line front view of the sealed visor.
Figure 17:
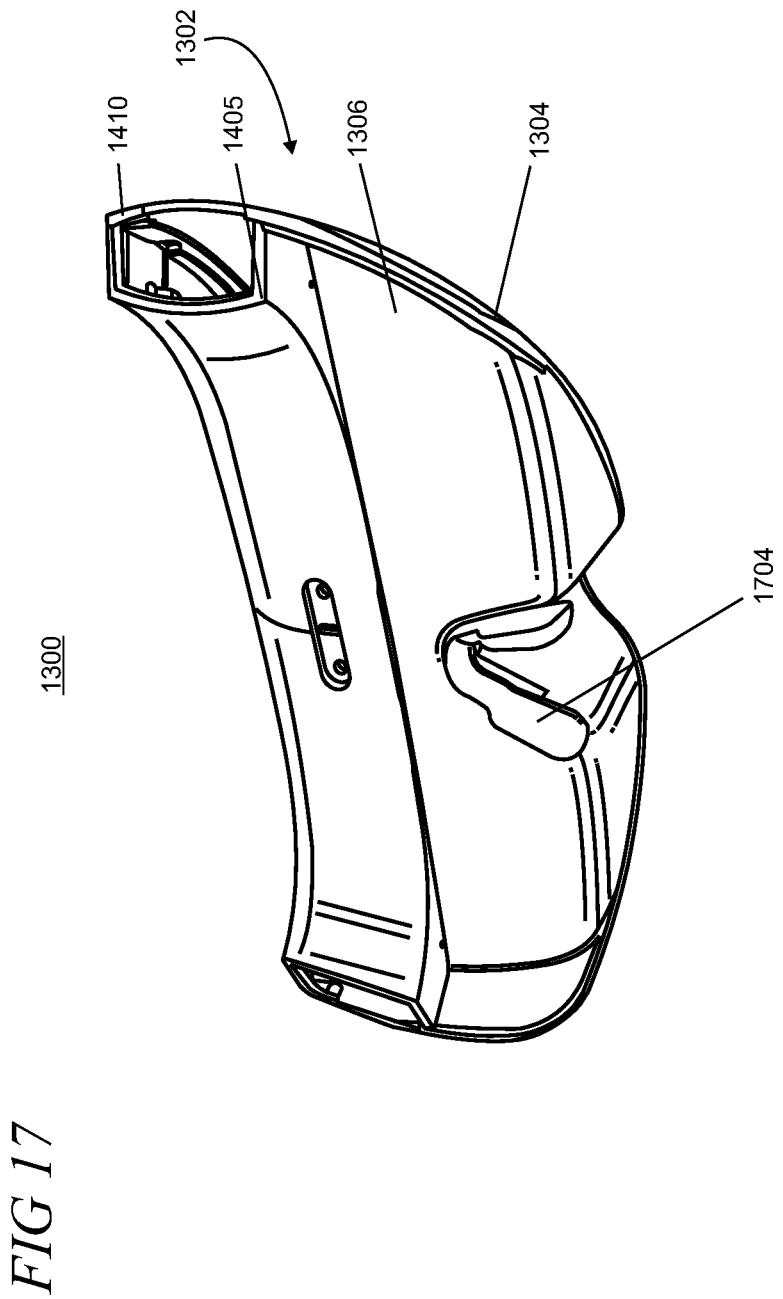
FIG. 17 shows a pictorial back view of the sealed visor.

As shown in FIGS. 15 and 17, the rear shield 1306 is configured in an ergonomically correct form to interface with the user's nose, and nose pads 1704 (FIG. 17) and other comfort features can be included (e.g., molded-in and/or added-on as discrete components). The sealed visor 1302 can also incorporate some level of optical diopter curvature (i.e., eye prescription) within the molded shields in some cases.

Figure 18:
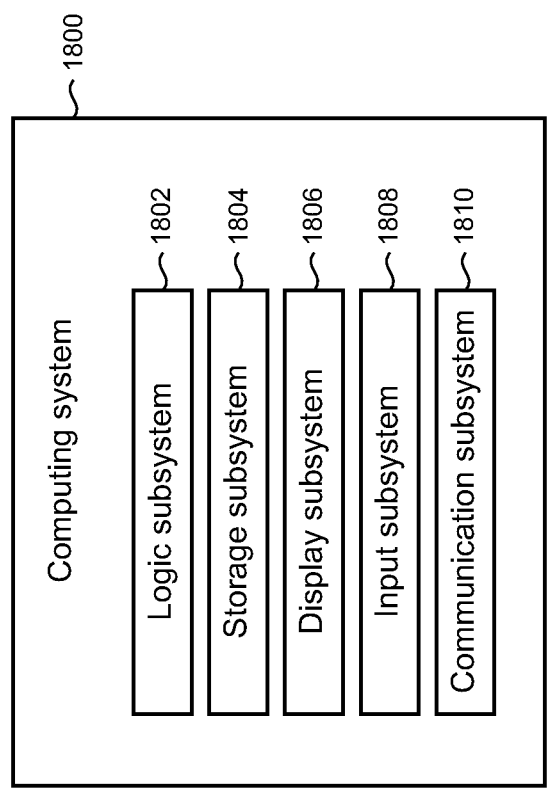
FIG. 18 shows an exemplary computing system.

FIG. 18 schematically shows a non-limiting embodiment of a computing system 1800 that can be used when implementing one or more of the configurations, arrangements, methods, or processes described above. The HMD device 104 may be one non-limiting example of computing system 1800. The computing system 1800 is shown in simplified form. It may be understood that virtually any computer architecture may be used without departing from the scope of the present arrangement. In different embodiments, computing system 1800 may take the form of a display device, wearable computing device, mainframe computer, server computer, desktop computer, laptop computer, tablet computer, home-entertainment computer, network computing device, gaming device, mobile computing device, mobile communication device (e.g., smart phone), etc.

The computing system 1800 includes a logic subsystem 1802 and a storage subsystem 1804. The computing system 1800 may optionally include a display subsystem 1806, an input subsystem 1808, a communication subsystem 1810, and/or other components not shown in FIG. 18.

The logic subsystem 1802 includes one or more physical devices configured to execute instructions. For example, the logic subsystem 1802 may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem 1802 may include one or more processors configured to execute software instructions. Additionally or alternatively, the logic subsystem 1802 may include one or more hardware or firmware logic machines configured to execute hardware or firmware instructions. The processors of the logic subsystem 1802 may be single-core or multi-core, and the programs executed thereon may be configured for sequential, parallel, or distributed processing. The logic subsystem 1802 may optionally include individual components that are distributed among two or more devices, which can be remotely located and/or configured for coordinated processing. Aspects of the logic subsystem 1802 may be virtualized and executed by remotely accessible, networked computing devices configured in a cloud-computing configuration.

The storage subsystem 1804 includes one or more physical devices configured to hold data and/or instructions executable by the logic subsystem 1802 to implement the methods and processes described herein. When such methods and processes are implemented, the state of the storage subsystem 1804 may be transformed—for example, to hold different data.

The storage subsystem 1804 may include removable media and/or built-in devices. The storage subsystem 1804 may include optical memory devices (e.g., CD (compact disc), DVD (digital versatile disc), HD-DVD (high definition DVD), Blu-ray disc, etc.), semiconductor memory devices (e.g., RAM (random access memory), ROM (read only memory), EPROM (erasable programmable ROM), EEPROM (electrically erasable ROM), etc.) and/or magnetic memory devices (e.g., hard-disk drive, floppy-disk drive, tape drive, MRAM (magneto-resistive RAM), etc.), among others. The storage subsystem 1804 may include volatile, nonvolatile, dynamic, static, read/write, read-only, random-access, sequential-access, location-addressable, file-addressable, and/or content-addressable devices.

It may be appreciated that the storage subsystem 1804 includes one or more physical devices, and excludes propagating signals per se. However, in some implementations, aspects of the instructions described herein may be propagated by a pure signal (e.g., an electromagnetic signal, an optical signal, etc.) using a communications medium, as opposed to being stored on a storage device. Furthermore, data and/or other forms of information pertaining to the present arrangement may be propagated by a pure signal.

In some embodiments, aspects of the logic subsystem 1802 and of the storage subsystem 1804 may be integrated together into one or more hardware-logic components through which the functionality described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

When included, the display subsystem 1806 may be used to present a visual representation of data held by storage subsystem 1804. This visual representation may take the form of a graphical user interface (GUI). As the present described methods and processes change the data held by the storage subsystem, and thus transform the state of the storage subsystem, the state of the display subsystem 1806 may likewise be transformed to visually represent changes in the underlying data. The display subsystem 1806 may include one or more display devices utilizing virtually any type of technology. Such display devices may be combined with logic subsystem 1802 and/or storage subsystem 1804 in a shared enclosure in some cases, or such display devices may be peripheral display devices in others.

When included, the input subsystem 1808 may include or interface with one or more user-input devices such as a keyboard, mouse, touch screen, or game controller. In some embodiments, the input subsystem may include or interface with selected natural user input (NUI) components. Such components may be integrated or peripheral, and the transduction and/or processing of input actions may be handled on- or off-board. Exemplary NUI components may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing components for assessing brain activity.

When included, the communication subsystem 1810 may be configured to communicatively couple the computing system 1800 with one or more other computing devices. The communication subsystem 1810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1800 to send and/or receive messages to and/or from other devices using a network such as the Internet.

Various exemplary embodiments of the present virtual reality environment with real world objects are now presented by way of illustration and not as an exhaustive list of all embodiments. An example includes a method performed by a head mounted display (HMD) device that supports rendering of a mixed-reality environment including holographic content from a virtual world and objects from a real world, comprising: obtaining sensor data for one or more objects in the real world included within a physical environment that adjoins a user of the HMD device; reconstructing a geometry for the one or more objects from the sensor data; using the reconstructed geometry, masking out areas of the real world for inclusion in the mixed-reality environment in which masked out areas contain no holographic content from the virtual world; and showing the mixed-reality environment on a display in the HMD device including portions of the virtual world and the masked out areas of the real world.

In another example, the sensor data includes depth data and the method further includes generating the sensor data using a depth sensor and applying surface reconstruction techniques to reconstruct the geometry. In another example, the method further includes generating depth data using depth-from-stereo imaging analyses. In another example, the method further includes tracking the user's head in the physical environment using reconstructed geometry of the physical environment to determine a current field of view. In another example, the method further performs the showing in a dynamic manner responsively to the current field of view. In another example, the method further includes exposing controls to the user for selecting objects in the real world that are included within the masked out areas. In another example, the method further includes using the reconstructed geometry to generate a holographic geometry in which the HMD device prevents holographic content from being rendered on the display either in front of the holographic geometry or behind the holographic geometry. In another example, the method further includes providing a control to the user to select areas of the real world to be masked out. In another example, the method further includes using the reconstructed geometry to identify real world objects to the user that are selectable for masking out. In another example, the masked out areas of the real world are configured to be decoupled or non-interactive with virtual world content.

A further example includes a head mounted display (HMD) device operable by a user in a physical environment, comprising: one or more processors; a see-through display having areas onto which a virtual reality environment is rendered to the user, a field of view of the rendered virtual reality environment being variable depending at least in part on a pose of the user's head in the physical environment; a sensor package; and one or more memory devices storing computer-readable instructions which, when executed by the one or more processors, perform a method comprising the steps of: generating surface reconstruction data for at least a portion of the physical environment using the sensor package, using the surface reconstruction data to create a holographic geometry in which selected portions of the physical environment are masked out to remain visible on the see-through display and virtual reality content is prevented from being rendered into the masked out portions, and operating the HMD device to use the holographic geometry when showing the selected portions of the real world and the virtual reality environment within the field of view of the see-through display.

In another example, the HMD device further includes providing one or more controls to enable the user to select portions of the real world that are masked out. In another example, the HMD device further includes using the surface reconstruction data to detect edges or surfaces of real world objects in the physical environment when creating the holographic geometry. In another example, the HMD device further includes using the surface reconstruction data to track a head position of the user and adjusting the field of view based on the head position while maintaining the holographic geometry. In another example, the HMD device further includes modeling the physical environment using a surface reconstruction data pipeline that implements a volumetric method creating multiple overlapping surfaces that are integrated. In another example, the HMD device further includes rendering special holographic content into masked out portions, the special holographic content being characterized by one or more of priority, importance, or urgency.

A further example includes one or more computer readable memories storing computer-executable instructions for rendering a virtual reality environment within a variable field of view of a head mounted display (HMD) device located in a real world environment, the method comprising the steps of: using data from a sensor package incorporated into the HMD device to dynamically generate a surface reconstruction model of the real world environment including real world objects included therein; enabling the user to select real world objects to be visible on a display of the HMD device; and using the surface reconstruction model to render the virtual reality environment without obscuring visibility of the selected real world objects.

In another example, the one or more computer readable memories further include tracking a location of an HMD device user's head in the real world environment using the surface reconstruction model of the real world environment to determine a field of view of the virtual reality environment. In another example, the one or more computer-readable memories further include refreshing the rendered virtual reality environment as the field of view changes. In another example, the one or more computer-readable memories further include enabling the user to select the real world objects by tracking the user's projected gaze and receiving a selection instruction from the user comprising one of a control actuation, voice command, natural language interaction, or gesture.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed by a head mounted display (HMD) device that supports rendering of a mixed-reality environment including holographic content from a virtual world and objects from a real world, comprising:
    obtaining sensor data for one or more objects in the real world included within a physical environment that adjoins a user of the HMD device;
    reconstructing a geometry for the one or more objects from the sensor data;
    using the reconstructed geometry, masking selected areas of the real world for inclusion in the mixed-reality environment in which the masked areas include real world objects, the real world objects being viewable by the user as the mixed-reality environment is rendered on the HMD device;
    rendering the mixed-reality environment on a display in the HMD device including portions of the virtual world and the masked areas of the real world; and
    using the reconstructed geometry, creating a holographic geometry in which virtual content is prevented from being rendered in front of the masked areas regardless of the user's head pose or position relative to the virtual world.

2. The method of claim 1 in which the sensor data includes depth data and further including generating the sensor data using a depth sensor and applying surface reconstruction techniques to reconstruct the geometry.

3. The method of claim 1 further including generating depth data using depth-from-stereo imaging analyses.

4. The method of claim 1 further including tracking the user's head in the physical environment using reconstructed geometry of the physical environment to determine a current field of view.

5. The method of claim 4 further performing the showing in a dynamic manner responsively to the current field of view.

6. The method of claim 1 further including exposing controls to the user for selecting objects in the real world that are included within the masked areas.

7. The method of claim 1 further including using the reconstructed geometry to generate a holographic geometry in which the HMD device prevents holographic content from being rendered on the display either in front of the holographic geometry or behind the holographic geometry.

8. The method of claim 1 further including providing a control to the user to select areas of the real world to be masked.

9. The method of claim 1 further including using the reconstructed geometry to identify real world objects to the user that are selectable for masking.

10. The method of claim 1 in which the masked areas of the real world are configured to be decoupled or non-interactive with virtual world content.

11. A head mounted display (HMD) device configured to render a mixed-reality environment including holographic content from a virtual world and objects from a real world, and operable by a user in the real world, comprising:
one or more processors;
a see-through display having areas onto which a virtual reality environment is rendered to the user, a field of view of the rendered virtual reality environment being variable depending at least in part on a pose of the user's head in the real world;
a sensor package; and
one or more memory devices storing computer-readable instructions which, when executed by the one or more processors, perform:
generating surface reconstruction data for at least a portion of the real world using the sensor package,
using the surface reconstruction data to create a holographic geometry, in which selected areas of the real world are masked for inclusion in the mixed-reality environment, the masked areas including real world objects, the real world objects being viewable by the user as the mixed-reality environment is rendered on the see-through display, and
operating the HMD device to use the holographic geometry when rendering the masked areas of the real world and the virtual reality environment within the field of view of the see-through display,
the holographic geometry created so that virtual content is prevented from being rendered in front of the masked areas regardless of the user's head pose or position relative to the virtual world.

12. The HMD device of claim 11 further including providing one or more controls to enable the user to select portions of the real world that are masked.

13. The HMD device of claim 11 further including using the surface reconstruction data to detect edges or surfaces of real world objects in the real world environment when creating the holographic geometry.

14. The HMD device of claim 11 further including using the surface reconstruction data to track a head position of the user and adjusting the field of view based on the head position while maintaining the holographic geometry.

15. The HMD device of claim 11 further including modeling the real world environment using a surface reconstruction data pipeline that implements a volumetric method creating multiple overlapping surfaces that are integrated.

16. The HMD device of claim 11 further including rendering special holographic content into masked areas, the special holographic content being characterized by one or more of priority, importance, or urgency.

17. One or more computer readable memories storing computer-executable instructions for rendering a mixed-reality environment including holographic content from a virtual world and objects from a real world within a variable field of view of a head mounted display (HMD) device located in the real world, the method comprising the steps of:
using data from a sensor package incorporated into the HMD device to dynamically generate a surface reconstruction model of the real world including real world objects included therein;
enabling the user to select real world objects to be visible on a display of the HMD device;
masking the selected areas of the real world for inclusion in the mixed-reality environment in which masked areas include real world objects, the real world objects being viewable by the user as the mixed-reality environment is rendered on the display; and
using the surface reconstruction model to render the mixed-reality environment including portions of the virtual world and the masked real world objects, and
using the reconstructed geometry, creating a holographic geometry in which virtual content is prevented from being rendered in front of the masked real world objects regardless of the user's head pose or position relative to the virtual world.

18. The one or more computer readable memories of claim 17 further including tracking a location of an HMD device user's head in the real world environment using the surface reconstruction model of the real world environment to determine a field of view of the virtual reality environment.

19. The one or more computer-readable memories of claim 17 further including refreshing the rendered virtual reality environment as the field of view changes.

20. The one or more computer-readable memories of claim 17 further including enabling the user to select the real world objects by tracking the user's projected gaze and receiving a selection instruction from the user comprising one of a control actuation, voice command, natural language interaction, or gesture.

* * * * *